United States Patent

[11] 3,621,480

[72] Inventor John David Brownlie
Chesham, England
[21] Appl. No. 10,417
[22] Filed Feb. 11, 1970
[45] Patented Nov. 16, 1971
[73] Assignee The Post Office
London, England
[32] Priority Feb. 14, 1969
[33] Great Britain
[31] 8,217/69

[54] ELECTRICAL NETWORKS
10 Claims, 14 Drawing Figs.

[52] U.S. Cl. .......... 333/28, 333/11, 333/28 B
[51] Int. Cl. .......... H03h 5/00
[50] Field of Search .......... 333/28, 28 A, 28 B, 28 T, 6, 11

[56] References Cited

UNITED STATES PATENTS

| | | | |
|---|---|---|---|
| 1,920,041 | 7/1933 | Vos et al. | 333/28 |
| 3,273,079 | 9/1966 | Curtis | 333/11 |

FOREIGN PATENTS

| | | | |
|---|---|---|---|
| 746,236 | 3/1956 | Great Britain | 333/28 |
| 823,608 | 11/1959 | Great Britain | 333/28 |

*Primary Examiner*—Herman Karl Saalbach
*Assistant Examiner*—Saxfield Chatmon, Jr.
*Attorney*—Hall & Houghton

ABSTRACT: Passive electrical networks for the generation of even- and odd-echo-pairs suitable for use in annulling gain and phase inequalities in color television signals are described. The networks are of the bridged-T-type. A center-tapped inductor forms the horizontal bar of the "T" and an echo-generating circuit forms the vertical bar. The bridging network contains components which with the shunt inductance and self-capacitance of the inductor form a fourth order approximation to a delay line. Values are chosen so that the inductor has a hybrid coupling action. Compensation for leakage inductance of the inductor consists of introducing delays into the echo-generating circuit and delay circuit. Adjustment of the networks and modifications to the echo-generating circuit are described.

JOHN D BROWNLIE
INVENTOR
BY [signature]
ATTORNEY

JOHN D. BROWNLIE
INVENTOR

BY [signature]

ATTORNEY

JOHN D. BROWNLIE,
INVENTOR
BY Hall & Houghton
ATTORNEY

JOHN D BROWNLIE,

INVENTOR

BY Hall & Houghton

ATTORNEY

JOHN D BROWNLIE,
INVENTOR
BY Hall & Houghton
ATTORNEY

ELECTRICAL NETWORKS

This invention relates to electrical circuits for the generation of echo-patterns, and has particular but not exclusive reference, to circuits suitable for annulling gain and delay inequalities between different parts of a color television signal arising in a link or other network.

One method of correcting chrominance/luminance gain and delay inequalities arising in links and equipment is to use even-echo-pairs and odd-echo-pairs of adjustable amplitude to annul these two inequalities independently. Since chrominance signals modulate a color subcarrier of frequency $f_c$=4.43 mHz. the gain and delay inequalities to be annulled are those between two bands centered respectively around $f_c$ (4.43 mHz. for the chrominance signal and zero frequency (for the luminance signal). FIGS. 1 and 2 show respectively the gain and delay characteristics produced by adding even and odd-echo-pairs pairs respectively to a main signal. For an even pair of echoes of relative amplitude $k$ not to affect the DC transmission, they must be accompanied by an echo of relative amplitude $-2k$ coincident with the main signal. The addition of an even-echo-pair causes no delay inequality and the addition of an odd-echo-pair causes no gain inequality between $f_c$ (=$1/2T$) and zero frequency.

Several realizations of echo-pattern networks have been described, for example, J.M. Linke, "Passive networks for annulling gain and delay inequalities," International Broadcasting Convention, 1968; I.E.E. Conference publication No. 46, Part 1. These networks are constructed from reactances approximating open or short-circuited delay-lines, transformers and resistors.

FIG. 3 shows a known circuit used for the generation of echo-patterns. A hybrid splits the incoming signal into two parts, one of which is considered as the main signal, while the other is fed to the echo-generating equipment. The two parts of the signal are then recombined in a second hybrid. A disadvantage of such a circuit is that it contains transformers and many other components.

It is an object of the invention ro provide improved passive electrical circuitry for the generation of echo-pattern signals.

The present invention provides an electrical network having:

a pair of input terminals, a pair of output terminals, a center-tapped inductor connected from one input terminal to one output terminal, the other input terminal and the other output terminal being common, means connected across the inductor so as to provide therewith a delay circuit connected from the one input terminal to the one output terminal, and An echo-generating circuit connected from the center tap of the inductor to the common terminals, the arrangement being such that when used with a matched input circuit and a matched output circuit a hybrid coupling exists between the input terminals, the output terminals, the delay circuit, and the echo-generating circuit whereby an output signal consisting of a main signal accompanied by an echo-pattern appears at the output terminals when a signal is applied at the input terminals.

The term "hybrid coupling" is used herein to mean that in relation to a four terminal-pair network electrical energy introduced at any one terminal-pair divides between two of the other terminal-pairs with substantially no transfer of energy to the remaining terminal pair. In a network of the invention the input terminals, the output terminals, the connections to the delay circuit, and the connections to the echo-generating circuit represent the four terminal-pairs. when the impedances of the delay circuit and the echo-generating circuit are correctly chosen and the network is used between a matched source and load a hybrid coupling exists such that:

i. the input terminals are coupled to the echo-generating circuit and the delay circuit but not the output terminals;

ii. the echo-generating circuit is coupled to the input terminals and the output terminals but not the delay circuit;

iii. the delay circuit is coupled to the input terminals and the output terminals but not the echo-generating circuit;

iv. the output terminals are coupled to the echo-generating circuit and the delay circuit but not the input terminals.

Preferred embodiments of the invention consist of echo-pattern networks which employ fewer components than previously proposed circuits, contain no transformers other than center-tapped inductors, and which may be adjusted to give a required performance without undue difficulty.

In order that the invention may be fully understood and readily carried into effect certain embodiments will now be described with reference to the accompanying drawings of which:

Figure 6:
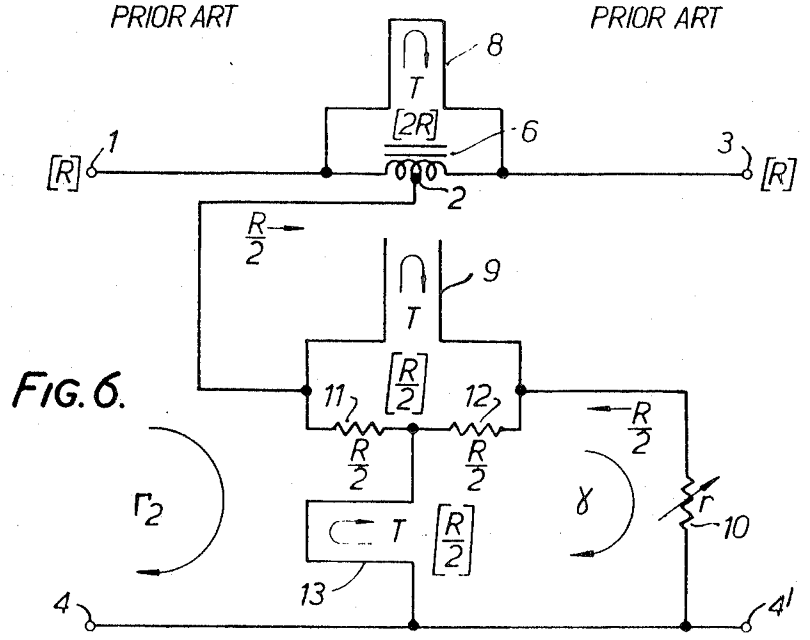
FIG. 6 shows an ideal even-echo-pair network embodying the invention.

Referring firstly to FIG. 6, there is shown an ideal even-echo-pair network embodying the invention which has a transfer function $F_e(s)$ (where $s$ is complex frequency) given by the equation:

$$F_e(s)=K[e^{\cdot 7E' sT}+k_e(1-2e^{\cdot 7E' sT}+e^{\cdot 7E' sT})]$$

where $k$ is a constant and $k_e$ is the adjustable relative echo amplitude. The network has input terminals 1 and 4 and output terminals 3 and 4', terminals 4 and 4' being common. A center-tapped inductor 6 is connected from terminal 1 to terminal 3 and has a center-tap 2. The inductor 6 is an ideal component of infinite shunt inductance but cannot be produced in practice. A short-circuit terminated delay-line 8 of characteristic impedance 2R ohms and one-way delay time T/2 are connected across the inductor 6. An echo-generating circuit comprising a constant impedance bridged-T section terminated by a variable resistance 10 of value $r$ ohms. The bridged-T section comprises two resistors 11 and 12 (both equal to R/2 ohms), an open-circuit terminated delay line 9 of characteristic impedance R/2 ohms and one-way delay time T/2, and a short-circuit terminated delay line 13 of characteristic impedance R/2 ohms and one-way delay time T/2. The center-tap 2 is connected to one end of the resistor 11 whose other end is connected to one end of the resistor 12. The other end of the resistor 12 is connected through the resistor 10 to the common terminals 4 and 4'. The input end of the delay line 9 is connected across the resistors 11 and 12 and the input end of delay line 13 is connected from the junction of the resistors 11 and 12 to the common terminals 4 and 4'.

Figure 7:
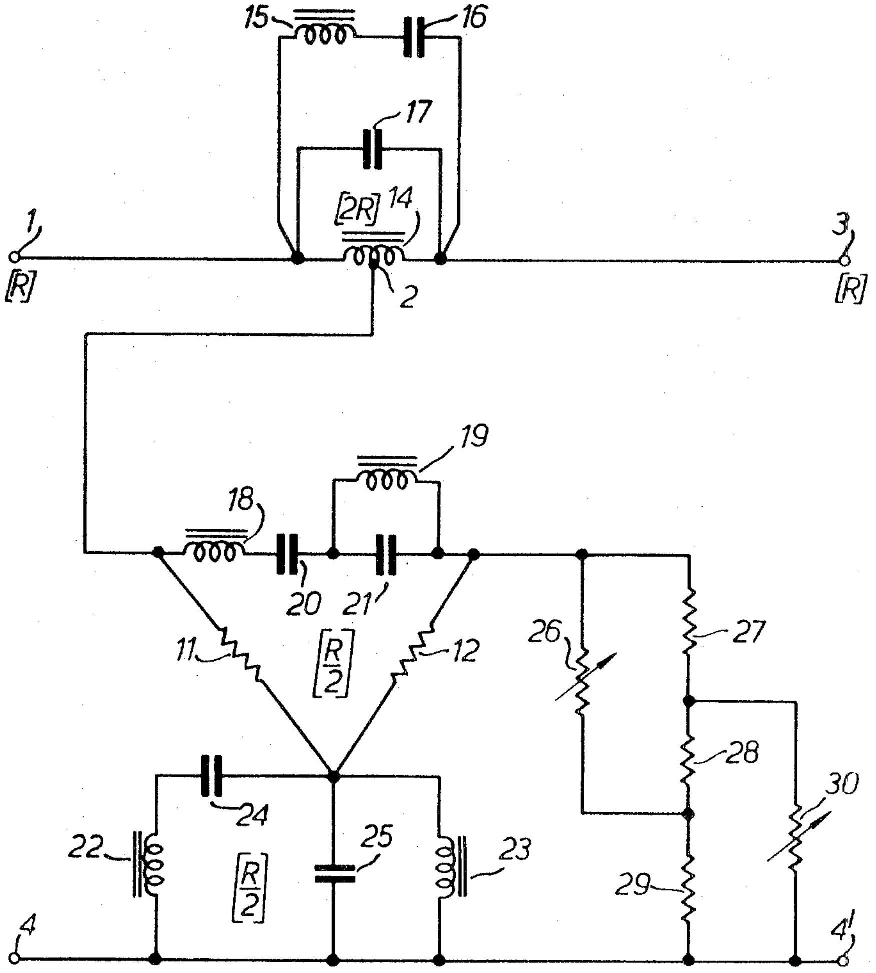
FIG. 7 shows an even-echo-pair network with lumped reactances embodying the invention.

FIG. 7 shows a circuit electrically equivalent to that of FIG. 6 but in a practical form. The delay lines 8, 9 and 13 are constructed according to a fourth-order equiripple lumped reactance delay approximant (vide E. Ulbrich and H. Piloty, Archiv der Elektrischen Ubertragung, Oct. 1960, 14, 10, pp. 451 to 467). The ideal center-tapped inductor 6 of FIG. 6 is replaced by a practical component 14. Thus the line 8 is realized by the center-tapped inductor 14, an inductor 15 and two capacitors 16 and 17; the delay line 9 by inductors 18, 19 and capacitors 20, 21; and delay line 13 by inductors 22, 23 and capacitors 24, 25. The resistor 10 is replaced in FIG. 7 by a network of five resistors, 26, 27, 28, 29, 30, shown separately in FIG. 8. Precautions are taken to ensure that practical imperfections in the inductor 14 do not disturb the operation of the circuit. Thus, the two halves of the inductor 14 are wound very closely together in a bifilar manner to ensure very close coupling. The shunt inductance of the inductor 14 is used as a component in the realization of the delay line 8 and its self-capacitance is allowed for in choosing the value of capacitor 17. That is to say, the departure of inductor 14 from the ideal of pure infinite shunt inductance is overcome by absorbing its imperfections in the realization of the delay line 8.

In spite of the above precautions the inductor 14 may still have a very small, but significant, leakage inductance which is effectively in series with the center-tap 2. This leakage inductance can slightly impair the accuracy of the network as a measuring device but it may be absorbed into a T-section approximation to a very short delay-line (of the order of 3 ns. for $0.03\mu$ h. leakage inductance in a $9\mu$ h. coil). Such a T-section consists of two inductors forming the horizontal bar of the "T" and a capacitor connected to the junction of the inductors forming the vertical bar of the "T." Thus to absorb the leakage inductance of the inductor 14 an extra inductance (not shown) is added in series with the center-tap 2 and a capacitor (not shown) connected from the center-tap 2 to the common terminals 4 and 4'. The horizontal bar of the "T" referred to above consists of the leakage inductance in series with the added inductor. It will be appreciated that as this modification adds effectively a time delay (having an overall effect of 2×3 ns.=6 ns. in the example quoted) in series with the echo-generating circuit a corresponding extra time delay (here 6 ns.) must be added in series with the delay circuit to preserve correct operation of the network.

Figure 1A:
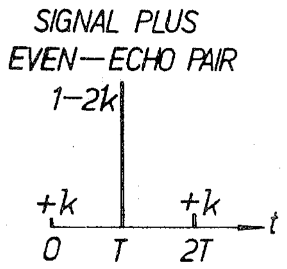
FIGS. 1, 2 and 3 are described above.
Figure 1B:
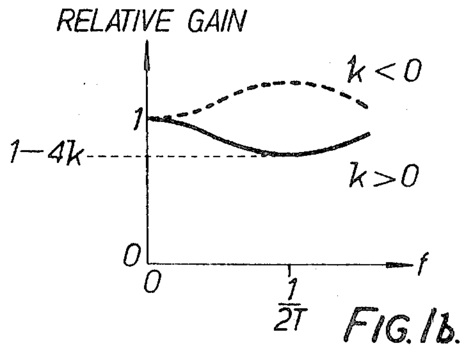
Figure 1C:
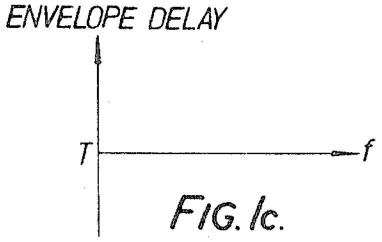
Figure 2A:
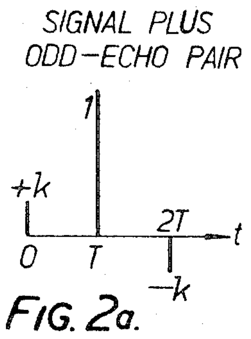
Figure 2B:
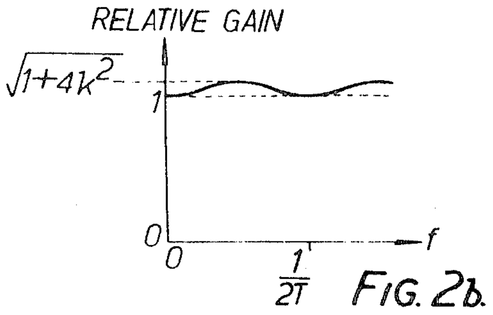
Figure 2C:
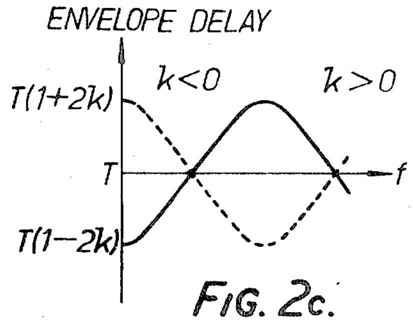
Figure 3:
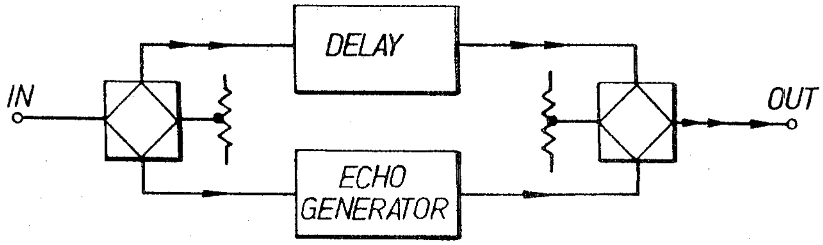
FIG. 3. PRIOR ART

The operation of the network will now be explained in terms of FIG. 6, the operation of the practical circuit being equivalent electrically. The network is intended for operation between matched input and output circuits of impedance R ohms. A signal introduced at the input terminals 1, 4 divides between the delay line 8 and the echo-generating circuit (9, 10, 11, 12, 13) but is not transmitted directly to the output terminals 3, 4' because of the hybrid action of the coil 6. A signal appears at the output due to transmission through the delay line 8 after a time T, The echo-generating circuit provides components at time zero, time T and time 2T. Thus the overall output corresponds to the echo-pattern shown in FIG. 1. The resistor 10 enables the echo amplitude and sign to be adjusted. The network is able to act as an echo-pattern generator by virtue of the hybrid action of the ideal inductor 6. The same hybrid action results in the practical circuit (FIG. 7) because the finite shunt-inductance of the practical center-tapped inductor and its shunt capacitance are made part of the delay circuit effectively providing a delay circuit bridging an ideal component.

Figure 4:
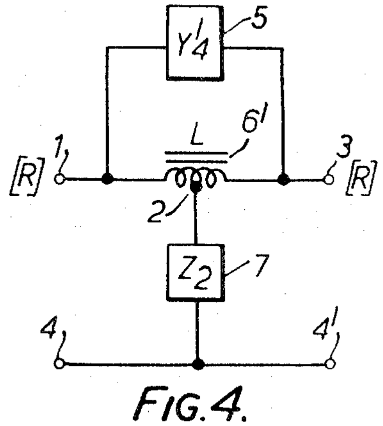
FIG. 4. PRIOR ART
FIGS. 4 and 5 show alternative realizations of a constant-impedance delay section.
Figure 5:
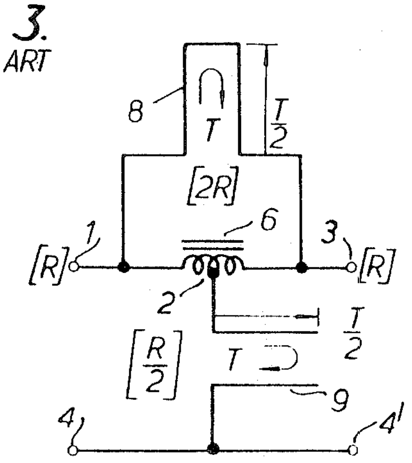
FIG. 5. PRIOR ART

As a further aid to understanding the operation of the invention the known circuits of FIGS. 4 and 5 will be compared with the novel circuits of FIGS. 6 and 7. For the purpose of comparison corresponding components in the different figures have the same references.

A lumped delay-line section is shown in FIG. 4, and can be represented by scattering parameters. The delay-line section comprises two ports respectively provided by terminals 1, 4 and 3, 4' a two-terminal network 5 of admittance $Y'_4$ connected from terminal 1 to terminal 3, a center-tapped inductor 6' of inductance L connected in parallel with the network 5, and a two-terminal network 7 of impedance $Z_2$ connected from the center-tap 2 of the inductor 6' to common terminals 4, 4' connected to earth.

The shunt inductance (L) of the inductor 6' may be included with the admittance $Y'_4$ to form an effective admittance $Y_4$ for the purpose of defining the scattering parameters of the circuit. That is to say, the two-terminal network 5 may be considered to have an admittance $Y_4$ and the center-tapped inductor may be considered to be ideal (that is, having an infinite shunt inductance) and the overall circuit will be effectively electrically unchanged. If $\Gamma_2(s)$ and $\Gamma_4(s)$ (where $s$ is complex frequency) are reflection coefficients corresponding respectively to $Z_2(s)$ with reference to R/2 and $Z_4(s)$ with reference to 2R (where $Z_4=1Y_4$) then the circuit may be represented by the equation:

$$\begin{bmatrix} W_1 \\ W_3 \end{bmatrix} = \frac{1}{2}\begin{bmatrix} \Gamma_2+\Gamma_4 & \Gamma_2-\Gamma_4 \\ \Gamma_2-\Gamma_4 & \Gamma_2+\Gamma_4 \end{bmatrix}\begin{bmatrix} U_1 \\ U_3 \end{bmatrix} \quad (1)$$

where $W_1$ and $W_3$ are output variables at ports (1,4) and (3,4) respectively and $U_1$ and $U_3$ are input variables at these ports respectively. Each of the quantities on the principal diagonal is a reflection coefficient at one port when the other port is terminated by a reference resistance R; each of the off-diagonal quantities is equal to the insertion transfer function between equal source and load resistances of R.

In the ideal case (or approximately so in practical cases) the reactances in delay sections may be regarded as being the reactances of open-circuited and short-circuited delay lines. In the unbalanced form of delay section shown in FIG. 4, the characteristic impedances for the shunt and series arms are R/2 and 2R respectively and both reactances give reflection delays equal to T. Thus the network of FIG. 4 may be represented by a network containing delay lines as shown in FIG. 5. The impedance 5 is represented by a short circuit terminated delay line 8 of one-way delay time T/2 and the impedance 7 by an open-circuit terminated delay line 9 also of one-way delay time T/2. The remainder of the circuit is unchanged.

The reflection coefficients corresponding to characteristic impedances R/2 and 2R respectively are simply $e^{'7E'sT}$ and $-e^{'7E'}$. Substitution of $\Gamma_2=e^{'7E'sT}$ and $\Gamma_4=-e^{'7E'sT}$ in equation 1 yields the scattering representation of an ideal delay section in the following equation;

$$\begin{bmatrix} W_1 \\ W_3 \end{bmatrix} = \begin{bmatrix} o & e^{-sT} \\ e^{-sT} & o \end{bmatrix}\begin{bmatrix} U_1 \\ U_3 \end{bmatrix} \quad (2)$$

The scattering (or insertion) transfer function of the network is $$\Gamma_{31}(s)=\frac{1}{2}[e^{'7E'sT}+\Gamma_2] \ (3)$$

It may be shown that the transfer functions of an even-echo-pair network is $$F_e(s)=K[e^{'7E'sT}+k_e(1-2e^{'7E'sT}+e^{'7E'2sT})] \ (4)$$

where $K$ is a constant and $k_e$ is the adjustable relative echo amplitude.

It will be appreciated that if $\Gamma_2(s)$ satisfies the equation $$\Gamma_2(s)=k_e(1-2e^{'7E'sT}+e^{'7E'2sT})=k_e(1-e^{'7E'sT})^2 \ (5)$$

then the network will function as an even-echo-pair network.

The required function $\Gamma_2(s)$ to satisfy equation is provided by the echo-generating circuit in FIGS. 6 and 7. The bridged-T section of the echo-generating circuit has a transfer function $\Gamma(s)$ where:

$$\Gamma(s)=\frac{1}{2}+\frac{1}{4}(-e^{'7E'sT}-e^{'7E'sT})=\frac{1}{2}(1-e^{'7E'sT}) \ (6)$$

and the whole echo-generating circuit a reflection coefficient $$\Gamma_2(s)=\gamma/4(1-e^{'7E'sT})^2 \ (7)$$

where $$\gamma=r-(R/2/r+R/2$$

Comparison with equation 6 shows that the complete network adds an even pair of echoes with a relative amplitude $k_e=\gamma/4$ which is adjustable over the range −0.25 to +0.25. This is satisfactory for the intended application since the maximum gain inequality to be annulled is ±40 percent which requires a relative even-echo amplitude of only ±0.1.

Figure 8:
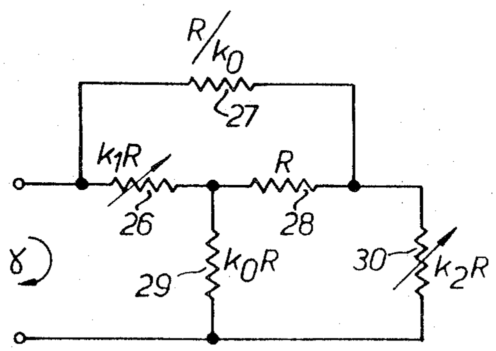
FIG. 8 shows a one-port network which provides two additive noninteracting reflections.

Referring now to Fig. 8, the resistors 26, 27, 28 29 and 30 have values $k_1$R (variable), R/$k_o$, R, $k_o$R and $k_2$R (variable) respectively. If $\gamma_1$ and $\gamma_2$ are the reflection coefficients corresponding to $k_1$R and $k_2$R respectively $$\left(\text{that is } \gamma_1=\frac{k_1-1}{k_2+1};\ \gamma_2=\frac{k_2-1}{k_2+1}\right)$$

and is the reflection coefficient of the network, then $$\gamma=\left[\frac{1}{1+ko}\right]^2\gamma_1+\left[\frac{k_0}{1+k^0}\right]^2\gamma_2 \text{ in which}$$

the reflections coefficients $\gamma_1$ and $\gamma_2$ provide independently controllable contributions to $\gamma$.

The network of FIG. 8 enables steps of 1 percent in gain inequality from −5 to +5 percent to be provided with one switched set of resistors, and steps of 10 percent from −50 to +50 percent with a second, switched, exactly similar set of resistors (for which case $k_o=\sqrt{10}$).

In theory the network of FIG. 7 gives an envelope delay of 112.9±0.2 ns. over the frequency range of 0 to 7 MHz.; in practice, finite Q values and stray reactances permit the envelope delay of the main signal to be held within 112.9±1.0 ns. from 0 to 7 MHz. In order to achieve these figures, the following procedure is adopted for setting up the main-signal transmission. Initially the components are set to within ±one-half percent of their nominal values. The inductance in the series-tuned circuit is then trimmed to give this tuned circuit together with its leads an impedance zero at 8.89 MHz. The shunt capacitance is trimmed to give the whole fourth-order reactance an impedance pole at 4.43 MHz. With a nonreactive (or reactance-compensated) resistance of R/2 connected from the center-tap of the inductor 14 to the common terminals 4,4', the swept loss and envelope delay of the section are then fairly flat in the range 0 to 7 MHz. However, a worthwhile improvement can be obtained from a very slight adjustment of the center-tapped coil 14 followed by a readjustment of the shunt capacitance. The envelope delay and insertion loss of this main-signal section can be confined to 112.9±1.0 ns. and 6.05±0.05 db. respectively over the range 0 to 7 MHz.

The resistances 26, 27, 28, 29 and 30 arranged in the echo-generating circuit (shown separately in FIG. 8) provide two additive, noninteracting reflections. In the settingup of the echo-generating circuit, the capacitance of the parallel-tuned circuit in the series (or bridging) arm is trimmed to give this tuned circuit an impedance pole at 8.89 MHz. The series inductance is then trimmed to give the whole series arm an impedance zero at 8.89 MHz., and the shunt capacitor is trimmed to give the whole shunt arm an impedance pole at 4.43 MHz. The adjustable and fixed resistors (R/2=37.5 ohms for the customary line impedance of 75Ωmust be nonreactive (or reactance compensated) in the range 0 to 7 MHz.

Within the range 0 to 7 MHz. the complete circuit has a total delay spread of 4 ns. in the zero-echo setting, and a worst-case total spread of 0.1 db. in the zero-echo setting and the errors in the gain inequality settings are less than 1 percent.

A modification of FIG. 7 will now be described which is useful where echoes of only one sign are required. If the resistors 26, 27, 28, 29 and 30 are replaced by a short circuit the overall network will generate echoes of negative sign of amplitude which may be adjusted by changing the value of resistor 11. For very large values of resistor 11 the overall network is of approximately constant impedance. A further advantage of this modification is that the network does not have the transmission loss of the unmodified network.

An alternative modification consists of making resistor 11 infinity (that is, open circuit) and connecting a variable resistor in place of resistors 26, 27, 28, 29 and 30. The network will then generate positive echoes of adjustable amplitude. If the variable resistor is very low in value the network is of approximately constant impedance. The further advantage of the previous modification is also obtained in this modification.

The invention may be used to generate other echo patterns by the choice of a suitable echo-generating circuit. For example, the realization of an odd-echo-pair network will now be described using similar reference numerals to those already used. The transfer function of such a network is $$F_o(s)=K[e^{'7E'sT}+k_o(1-e^{'7E'2sT})] \quad (9)$$

where $k_o$ is the adjustable relative echo amplitude. Comparison with equation 3 shows that a realization with a modified delay section requires that $$\Gamma_2(s)=k_o(1-e^{'7E'2sT}) \quad (10)$$

Figure 9:
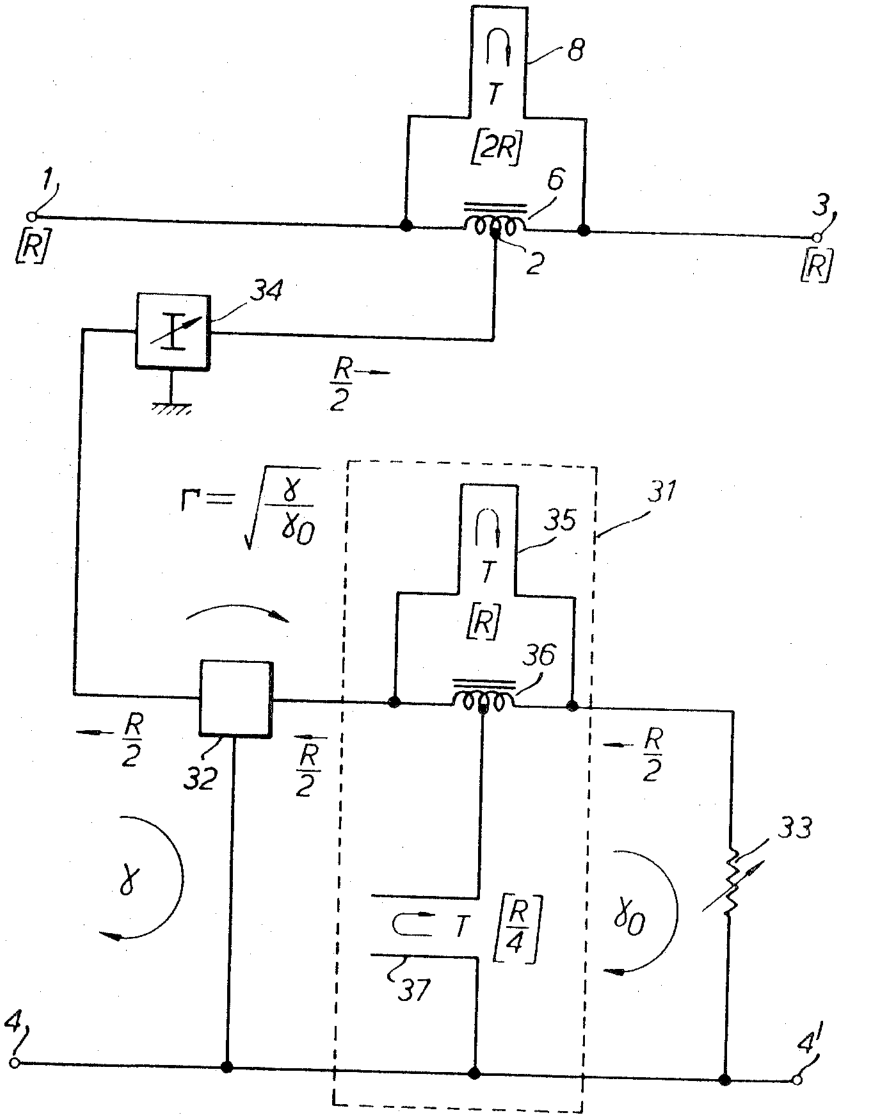
FIG. 9 shows an ideal odd-echo-pair network embodying the invention.

This reflection coefficient can, for example, be realized with the one-port network shown connected to the center-tap 2 of the center-tapped inductor 6 in FIG. 9. This network contains a constant impedance delay section 31 preceded by a resistive pi-section 32 and terminated with a resistance 33. A resistance value of less than R/2 for resistor 33 produces negative trailing echoes, and a value greater than R/2 positive trailing echoes. The two-part resistive section 32 has three functions: to produce a given reflection back to the center-tap of the inductor 6, to present a constant impedance of R/2 at its second port, and finally to scale the amplitude of the trailing echo to equal that of the leading echo. A switched attenuator 34 is also incorporated as a means for scaling the combined odd-echo-pair. The network is designed to produce extreme relative-echo-amplitudes of ±0.2215 corresponding to delay inequalities of ±100 ns.

Figure 10:
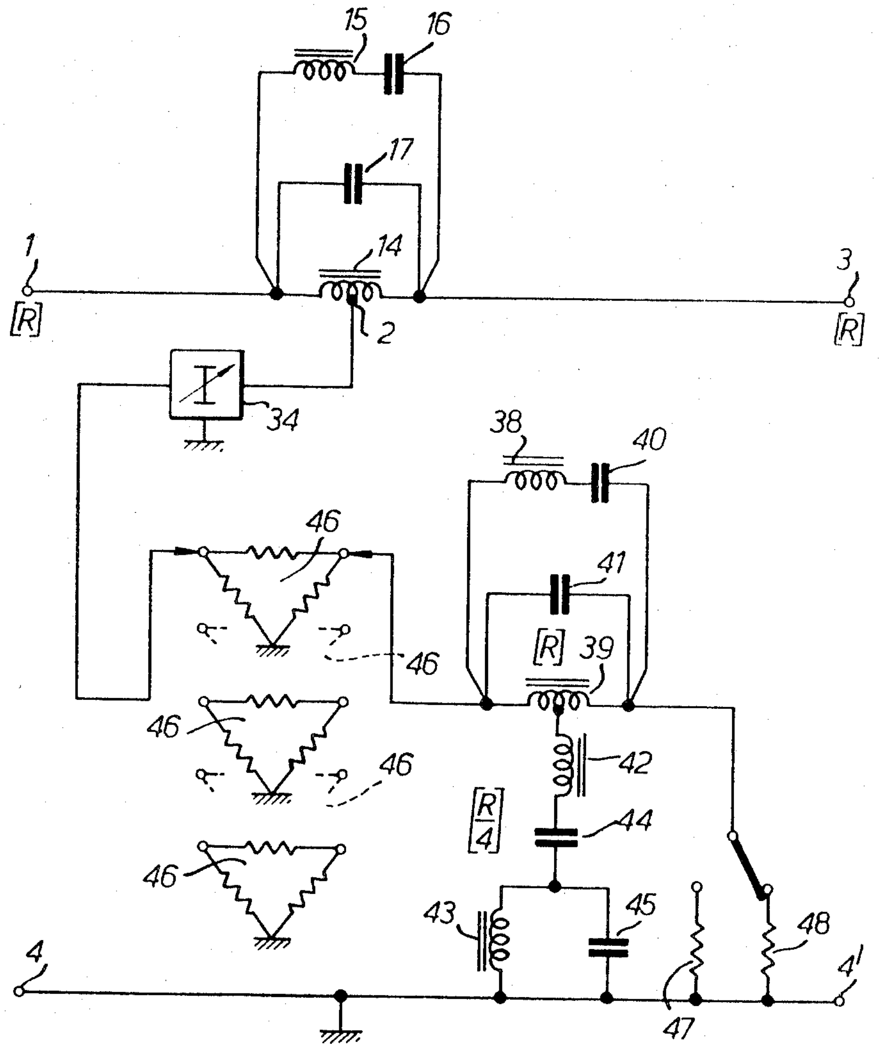
FIG. 10 shows an odd-echo-pair network with lumped reactances embodying the invention.

The constant impedance delay section 31 comprises a short-circuit terminated delay line 35 of total delay T and characteristic impedance R, a center-tapped inductor 36 and an open-circuit terminated delay line 37 of total delay T and characteristic impedance R/4. Fig. 10 shows a practical form of the idealized circuit shown in FIG. 9.

The delay lines of FIG. 9 are realized with fourth order reactances in a similar manner to that of the even-echo-pair circuit (FIG. 8). Thus delay line 8 is realized by an inductor 15, center-tapped inductor 14, and capacitors 16, 17; delay line 35 by center-tapped inductor 39, and capacitors 40, 41; and delay line 37 by inductors 42, 43 and capacitors 44, 45. The network performance in the zero-echo setting is similar to that of the even-echo-pair network. In the echo-generating circuit, a single resistance 47 less than R/2 is used to terminate the delay line for all negative trailing echoes. The two-port resistive network 32 consists of a pi-section of three resistors 46 switched in for each echo setting. The setting up of the delay section in the echo-generating circuit follows firstly the procedure already described for the main-signal transmission, i.e., with the shunt arm replaced by a reactance-compensated resistor. The shunt arm is then set up separately by a procedure which is the dual of that used for the series arm.

Theoretically, the odd-echo-pair should introduce no gain inequality between zero frequency DC and 4.43 MHz.; in practice the most extreme gain inequality introduced by the network is 0.1 db. The error in the delay inequality settings can be restricted in practice to be of the order of 1 to 2 ns.

It will be appreciated that other embodiments and modifications are possible within the scope of the invention. For example, the delay lines may be realized by networks of order greater than four. An echo-pattern other than an even- or an odd-echo-pair may be generated by using selected one-port networks to form the desired echo signal components which are then added to the delayed main signal as described.

I claim:

1. An electrical network having:

a pair of input terminals, a pair of output terminals, a center-tapped inductor connected from one input terminal to one output terminal, the other input terminal and the other output terminal being common, means connected across the inductor so as to provide therewith a delay circuit connected from the one input terminal to the one output terminal, and an echo-generating circuit connected from the center-tap of the inductor to the common terminals, the arrangement being such that when used with a matched input circuit and a matched output circuit a hybrid coupling exists between the input terminals, the output terminals, the delay circuit, and the echo-generating circuit whereby an output signal consisting of a main signal accompanied by an echo-pattern appears at the output terminals when a signal is applied at the input terminals.

2. An electrical network as claimed in claim 1, wherein the shunt-inductance of the center-tapped inductor, its self-capacitance and the network connected across the inductor form a lumped reactance approximation to a short circuit terminated delay line.

3. An electrical network as claimed in claim 2, wherein the echo-generating circuit is such that an even-echo-pair appears at the output terminals when a signal is applied at the input terminals.

4. An electrical network as claimed in claim 2, wherein the echo-generating circuit is such that an odd-echo-pair appears at the output terminals when a signal is applied at the input terminals.

5. An electrical network having:

a pair of input terminals, a pair of output terminals, a center-tapped inductor connected front one input terminal to one output terminal, the other input terminal and the other output terminal being common, means connected across the inductor so as to provide therewith a delay circuit connected from the one input terminal to the one output terminal wherein the shunt-inductance of the center-tapped inductor, its selfcapacitance and the network connected across the inductor form a lumped reactance approximation to a shirt circuit terminated delay line, and an echo-generating circuit comprising first and second resistors and variable resistance means, the first resistor having one end connected to the center-tap of the inductor and its other end connected to one end of the second resistor, the other end of the second resistor being connected to one end of the variable resistance means whose other end is connected to the common terminals, a lumped reactance approximation to an open-circuit terminated delay line connected across the first and second resistors, and a lumped reactance approximation to a short-circuit-terminated delay line connected from the junction of the first and second resistors to the common terminals, the arrangement being such that when used with a matched input circuit and a matched output circuit a hybrid coupling exists between the input terminals, the output terminals, the delay circuit, and the echo-generating circuit whereby an output signal consisting of a main signal accompanied by an echo-pattern appears at the output terminals when a signal is applied at the input terminals.

6. An electrical network having:

a pair of input terminals, a pair of output terminals, a center-tapped inductor connected from one input terminal to one output terminal, the other input terminal and the other output terminal being common, means connected across the inductor so as to provide therewith a delay circuit connected from the one input terminal to the one output terminal wherein the shunt-inductance of the center-tapped inductor, its selfcapacitance and the network connected across the inductor form a lumped reactance approximation to a short circuit terminated delay line, and an echo-generating circuit comprising first and second resistors and variable resistance means comprising third, fourth and fifth resistors in series, a sixth variable resistor connected across the third and fourth resistors, and a seventh variable resistor connected across the fourth and fifth resistors, the first resistor having one end connected to the center tap of the inductor and its other end connected to one end of the second resistor, the other end of the second resistor being connected to one end of the variable resistance means whose other end is connected to the common terminals, a lumped reactance approximation to an open-circuit terminated delay line connected across the first and second resistors, and a lumped reactance approximation to a short-circuit-terminated delay line connected from the junction of the first and second resistors to the common terminals, the arrangement being such that when used with a matched input circuit and a matched output circuit a hybrid coupling exists between the input terminals, the output terminals, the delay circuit, and the echo-generating circuit whereby an output signal consisting of a main signal accompanied by an echo-pattern appears at the output terminals when a signal is applied at the input terminals.

7. An electrical network having:

a pair of input terminals, a pair of output terminals, a center-tapped inductor connected from one input terminal to one output terminal, the other input terminal and the other output terminal being common, means connected across the inductor so as to provide therewith a delay circuit connected from the one input terminal to the one output terminal wherein the shunt-inductance of the center-tapped inductor, its selfcapacitance and the network connected across the inductor form a fourth-order lumped reactance approximation to a short circuit terminated delay line, and an echo-generating circuit comprising first and second resistors and variable resistance means. The first resistor having one end connected to the center tap of the inductor and its other end connected to one end of the second resistor, the other end of the second resistor being connected to one end of the variable resistance means whose other end is connected to the common terminals, a fourth-order lumped reactance approximation to an open-circuit-terminated delay line connected across the first and second resistors, and a fourth-order lumped reactance approximation to a short-circuit-terminated delay line connected from the junction of the first and second resistors to the common terminals, the arrangement being such that when used with a matched input circuit and a matched output circuit a hybrid coupling exists between the input terminals, the output terminals, the delay circuit, and the echo-generating circuit whereby an output signal consisting of a main signal accompanied by an echo-pattern appears at the output terminals when a signal is applied at the input terminals.

8. An electrical network having:

a pair of input terminals, a pair of output terminals, a center-tapped inductor connected from one input terminal to one output terminal, the other input terminal and the other output terminal being common, means connected across the inductor so as to provide therewith a delay circuit connected from the one input terminal to the one output terminal wherein the shunt-inductance of the center-tapped inductor, its self capacitance and the network connected across the inductor form a lumped reactance approximation to a short circuit terminated delay line, and an echo-generating circuit comprising a three terminal resistive pi-network having one terminal connected to the center-tap of the inductor, another terminal connected to the common terminals, and a constant impedance delay section connected from the remaining terminal to one end of variable resistance means, the other end of which is connected to the common terminals, the arrangement being such that when used with a matched input circuit and a matched output circuit a hybrid coupling exists between the input terminals, the output terminals, the delay circuit, and the echo-generating circuit whereby an output signal consisting of a main signal accompanied by an echo-pattern appears at the output terminals when a signal is applied at the input terminals.

9. An electrical network having:

a pair of input terminals, a pair of output terminals, a center-tapped inductor connected from one input terminal to one output terminal, the other input terminal and the other output terminal being common, means connected across the inductor so as to provide therewith a delay circuit connected from the one input terminal to the one output terminal wherein the shunt-inductance of the center-tapped inductor, its selfcapacitance and the network connected across the inductor form a lumped reactance approximation to a short circuit terminated delay line, and an echo-generating circuit comprising a three terminal resistive pi-network having one terminal connected to the center-tap of the inductor, another terminal connected to the common terminals, and a constant impedance delay section connected from the remaining terminal to one end of variable resistance means, the other end of which is connected to the common terminals, the constant impedance delay section consisting of a lumped reactance approximation to a short-circuitsterminated delay line including a further center-tapped inductor connected from the resistive pi-section to the variable resistive means, and a lumped reactance approximation to an open-circuit-terminated line connected from the center-tap of the further center-tapped inductor to the common terminals, the arrangement being such that when used with a matched input circuit and a matched output circuit a hybrid coupling exists between the input terminals, the output terminals, the delay circuit, and the echo-generating circuit whereby an output signal consisting of a main signal accompanied by an echo-pattern appears at the output terminals when a signal is applied at the input terminals.

10. An electrical network having:

a pair of input terminals, a pair of output terminals, a center-tapped inductor connected from one input terminal to one output terminal, the other input terminal and the other output terminal being common, means connected across the inductor so as to provide therewith a delay circuit connected from the one input terminal to the one output terminal wherein the shunt-inductance of the center-tapped inductor, its selfcapacitance and the network connected across the inductor form a fourth-order lumped reactance approximation to a short circuit terminated delay line, and an echo-generating circuit comprising a three terminal resistive pi-network having one terminal connected to the center-tap of the inductor, another terminal connected to the common terminals, and a constant impedance delay section connected from the remaining terminal to one end of variable resistance means, the other end of which is connected to the common terminals, the constant impedance delay section consisting of a fourth-order lumped reactance approximation to a short-circuit-terminated delay line including a further center-tapped inductor connected from the resistive pi-section to the variable resistive means, and a fourth-order lumped reactance approximation to an open-circuit-terminated delay line connected from the center-tap of the further center-tapped inductor to the common terminals, the arrangement being such that when used with a matched input circuit and a matched output circuit a hybrid coupling exists between the input terminals, the output terminals, the delay circuit, and the echo-generating circuit whereby an output signal consisting of a main signal accompanied by an echo-pattern appears at the output terminals when a signal is applied at the input terminals.

* * * * *